(No Model.)

W. F. NEWBOLD.
POTATO PLANTER.

No. 312,885. Patented Feb. 24, 1885.

WITNESSES
N. A. Clark
P. K. Turpin

INVENTOR
William F. Newbold
By R. S. & A. P. Lacey
Att'ys

UNITED STATES PATENT OFFICE.

WILLIAM F. NEWBOLD, OF CEDAR, IOWA.

POTATO-PLANTER.

SPECIFICATION forming part of Letters Patent No. 312,885, dated February 24, 1885.

Application filed June 7, 1884. (No model.)

*To all whom it may concern:*

Be it known that I, WILLIAM F. NEWBOLD, a citizen of the United States, residing at Cedar, in the county of Mahaska and State of Iowa, have invented certain new and useful Improvements in Potato-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to potato-planters; and it consists in the construction, combination, and arrangement of the several parts, as will be hereinafter more fully described and claimed.

Figure 1:
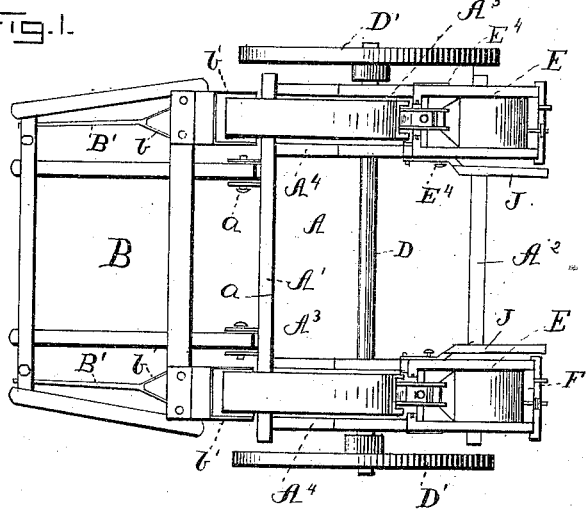
Figures 2, 3:
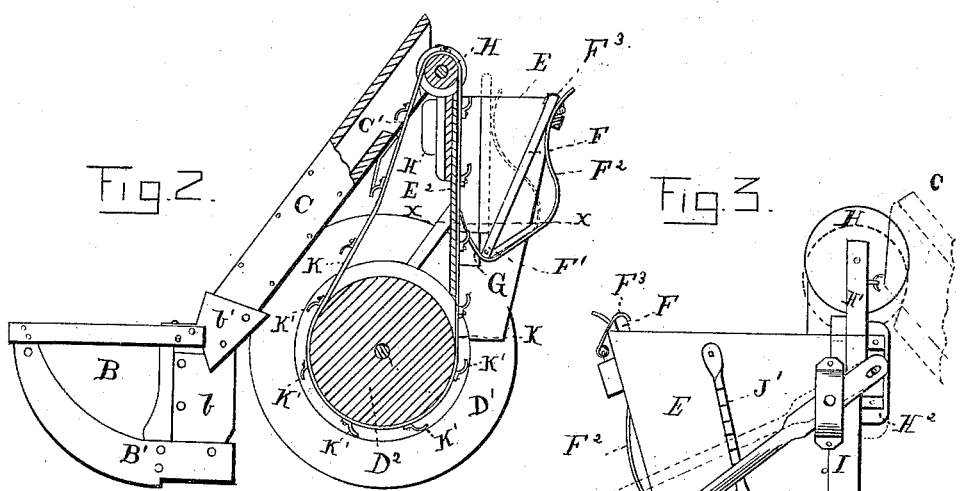
Figure 4:
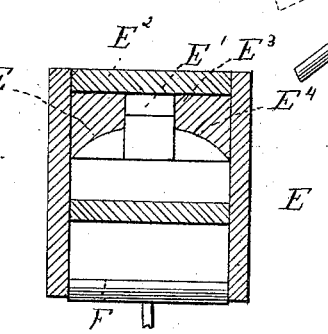

In the drawings, Figure 1 is a plan view, and Fig. 2 a side view, part in section, of my machine. Fig. 3 is a detail side view of the hopper or potato-receptacle. Fig. 4 is a transverse section on about line $x\,x$, Fig. 2.

In carrying out my invention I provide the main frame A and the front frame, B, hinged together at $a$.

The front frame has runners or openers B', at the rear end of which are formed the passages $b$, through which the potatoes are delivered into the ground. At the upper end of these passages I form an enlarged boxing, $b'$, fitted to receive the delivery end of the tubular conveyer C, presently described.

The main frame is composed of front bar, A', rear bar, A², side bars, A³ A³, and cross-bars A⁴ A⁴, extended between the front and rear bars, and parallel to the side bars, A³, as shown.

The axle D is journaled in the main frame, and has the drive-wheels D', which work, the same as the drive-wheels in a reaper, by means of a ratchet.

Pulleys D² D² are keyed on the axle D, preferably between the bars A³ A⁴. These pulleys, for convenience of reference, I term the "operating-pulleys."

The seed or potato hoppers E E are supported on the rear ends of the main frame in line with the operating-pulleys, and have their lower ends formed with narrow openings E', for the passage of the carrying-belt.

The front walls, E², of the hoppers are preferably grooved at E³, for the carrying-belt, and beveled at E⁴ inward toward said groove, so as to direct the potatoes to said belt in the operation of the machine.

By preference the back of the hopper is formed by the presser-board F, hinged at its lower end, F', and having its upper end held toward the front of the hopper and against the carrying-belt by means of a spring, F², preferably formed and arranged as shown.

Hooks F³ F³ are pivoted at one end on a suitable support, F⁴, extended between the upper rear end of the sides of the hopper, and has its bent end arranged to engage and hold the presser-board back, as shown in Fig. 2, when it is desired to fill the hopper, or for any other reason it is thought best to dispense with the tension of the spring against said board.

A valve or guard-spring, G, is projected up through the opening E', from the rear side of same, and bears at its upper end against the belt, presently described, there closing the opening E', and serving to prevent the potatoes from falling through the opening E', and yet permitting the passage of the belt, as will be understood from Fig. 2. Where desired, this spring may be secured to the presser-board within the hopper, or in any other suitable way to secure the desired object. It will be further understood that, where desired, this spring may be dispensed with, though I prefer its use, as thereby I am able to make the bottom opening, E', of the hopper larger than otherwise, and thus prevent all possibility of the hooks on the carrying-belt, presently described, becoming caught as they enter the hopper, as will be appreciated from Fig. 2.

The pulley H is journaled in supporting-arms H', extended from the plate or board H², which is held and movable vertically in guides I, secured or formed on the tripper-front side of the hopper. A lever, J, is pivoted on the side of the hopper end, has one end connected with the pulley, and its opposite end arranged to engage the rack J', formed or secured on the side of the hopper, as shown. By this construction, it will be seen, the pulley H may be adjusted and held at any suitable point to or from the hopper.

The tubular conveyers C are open at both ends, and have their lower ends rested in the boxes $b'$ and their upper ends suspended from the pulley-supports H', as most clearly shown in Fig. 3, and are slotted at the guide-pulley H, so as to permit the belt to pass clear through the conveyers on the under side adjacent to said pulley, as shown in Fig. 2. By supporting the conveyers on the adjustable frames the said conveyers are always arranged in position to properly receive the potatoes, no matter to what position the movable frames may be adjusted, as will be understood.

The carrier-belts K are carried around the operating-pulley and the pulley H and move within the hoppers and through slots C'. On this belt I secure hooks K', which catch the potatoes in passing through the hopper and carry and deliver them into the conveyers C, whence they are delivered into the ground in the manner before described.

It is manifest that instead of the hooks the belt might be provided with cups, or otherwise adapted to engage and elevate the potatoes.

I have shown my invention applied to a machine constructed to plant two rows. The parts may be duplicated so as to increase the number of rows as may be desired, or the invention could be applied to a machine formed to plant a single row.

Having thus described my invention, what I claim, and desire to secure by Letters Patent, is—

1. The combination, with the hopper and the carrying-belt moving therethrough, of the presser-board arranged in the hopper, having a tension toward and adapted to force the potatoes against the belt, substantially as set forth.

2. The combination, with the conveyer, the vertically-adjustable guide-pulley, the operating-pulley, and the hopper, of the belt passed around the operating and guide pulleys and through the hopper, and a presser-board arranged in said hopper, having a tension toward and adapted to force the potatoes against the carrying-belt, substantially as set forth.

3. The combination of the hopper having opening E', and provided with presser-board F, pivoted at its lower end, the belt moving upward through said hopper, and a spring, F², engaging the rear upper end of the presser F, whereby said presser is given a tension toward the belt, substantially as set forth.

In testimony whereof I affix my signature in presence of two witnesses.

WILLIAM F. NEWBOLD.

Witnesses:
JOHN F. LACEY,
W. R. LACEY.